(12) United States Patent
Milch

(10) Patent No.: US 8,441,344 B2
(45) Date of Patent: May 14, 2013

(54) VEHICLE ALARM CUSTOMIZATION SYSTEMS AND METHODS

(75) Inventor: Randal S. Milch, Bethesda, MD (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 425 days.

(21) Appl. No.: 12/510,352

(22) Filed: Jul. 28, 2009

(65) Prior Publication Data

US 2011/0029875 A1     Feb. 3, 2011

(51) Int. Cl.
*B60Q 1/00*     (2006.01)

(52) U.S. Cl.
USPC ........... 340/425.5; 340/438; 701/36; 715/727

(58) Field of Classification Search ............... 340/425.5, 340/426.1, 426.17, 426.2, 426.34, 438; 715/727; 711/100, E12.001; 381/86; 700/18; 701/36; 709/215; 710/13
See application file for complete search history.

(56) References Cited

U.S. PATENT DOCUMENTS

| | | | |
|---|---|---|---|
| 2005/0261815 A1* | 11/2005 | Cowelchuk et al. ............ | 701/36 |
| 2007/0182532 A1* | 8/2007 | Lengning et al. ............. | 340/439 |
| 2007/0241932 A1* | 10/2007 | Otero et al. ................... | 340/901 |
| 2007/0242836 A1* | 10/2007 | Basir et al. ...................... | 381/86 |
| 2008/0114904 A1* | 5/2008 | Kosco ............................. | 710/13 |
| 2009/0079555 A1* | 3/2009 | De Carcer et al. ............ | 340/441 |

* cited by examiner

*Primary Examiner* — Brent Swarthout

(57) ABSTRACT

Vehicle alarm customization systems and methods are disclosed. An exemplary method includes a vehicle alarm customization system providing a user interface configured to facilitate end-user customization of a vehicle alarm, receiving an end-user selection of an audio content instance via the user interface, accessing data representative of the audio content instance, and customizing the vehicle alarm to sound at least part of the audio content instance in response to a vehicle alarm trigger event.

22 Claims, 10 Drawing Sheets

VEHICLE ALARM CUSTOMIZATION SYSTEMS AND METHODS

BACKGROUND INFORMATION

Vehicle alarms are commonplace in many modern vehicles such as automobiles. A typical vehicle alarm is able to detect a trigger event and sound an audible alarm in response to the detected trigger event. The alarm is designed to alert an owner of the vehicle to certain dangers such as another person attempting to gain unauthorized access to or vandalize the vehicle.

One of the problems with vehicle alarms is that a vehicle owner is unable to readily determine, when a vehicle alarm is activated, whether the alarm is being produced by the owner's vehicle. Vehicle alarms tend to sound the same (or indistinctly similar) from vehicle to vehicle, causing those in hearing range of the alarm to question whether the alarm is applicable to their vehicle. This is not only wasteful of a vehicle owner's time in needing to respond to alarms that are not applicable to the owner's vehicle, but also reduces the effectiveness of vehicle alarms in general, as vehicle owners are conditioned to expect that the alarm is likely not applicable to their vehicle. Moreover, vehicle owners sometimes use vehicle alarms as a means to locate a vehicle from among many vehicles (e.g., in parking areas), and multiple similar sounding vehicle alarms can defeat such attempts to locate a vehicle.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
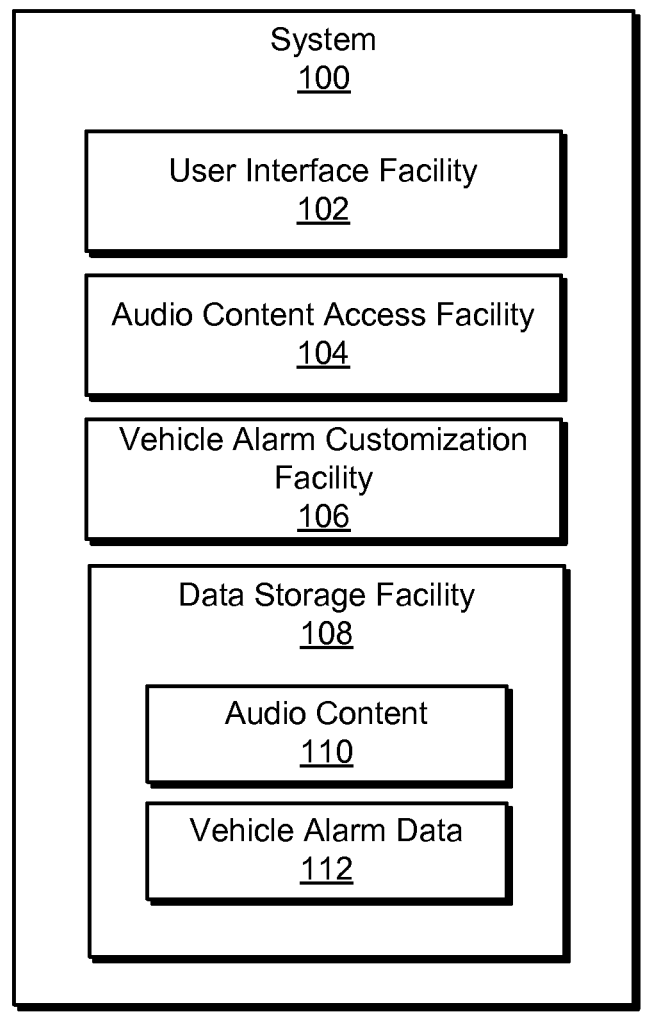
FIG. 1 illustrates an exemplary vehicle alarm customization system.

Exemplary vehicle alarm customization systems and methods are disclosed herein. As described in more detail below, in certain embodiments, the exemplary systems and methods disclosed herein may customize a vehicle alarm to sound an end-user-selected audio content instance in response to a vehicle alarm trigger event.

For example, an exemplary method includes a vehicle alarm customization system providing a user interface configured to facilitate end-user customization of a vehicle alarm, receiving an end-user selection of an audio content instance via the user interface, accessing data representative of the audio content instance, and customizing the vehicle alarm to sound at least part of the audio content instance in response to a vehicle alarm trigger event.

As used herein, the term "audio content" may refer generally to any content and/or data representative of content that may be sounded by a vehicle alarm. The term "audio content instance" as used herein may refer generally to any audio clip, song, ringtone, jingle, audio file (e.g., music file), audio recording, audio component of media content (e.g., audio component of a video clip), or any segment, component, or combination of these or other forms of audio content that may be audibly played back.

The terms "end user" and "user" will be used interchangeably to refer generally to any end user of a product and/or service, including, without limitation, an owner and/or operator of a vehicle and/or a vehicle alarm, an owner and/or operator of an end-user device (e.g., a mobile phone or audio player device) able to communicate with a vehicle and/or a vehicle alarm, and/or a subscriber to a service (e.g., a wireless service such as a vehicle wireless network service, a mobile phone data network service, and/or a vehicle alarm customization service). In some examples, the terms "end user" and "user" may refer to a retail distributor of a product and/or service, including, without limitation, a retail distributor of a vehicle, a vehicle alarm, an end-user device configured to interface with a vehicle and/or vehicle alarm, and a service such as a vehicle alarm customization service.

The term "vehicle alarm trigger event" as used herein may refer generally to any event that may be detected by a vehicle alarm and used to trigger an alarm. Typically, a vehicle alarm will sound an audible alarm in response to a detected vehicle alarm trigger event. Examples of such trigger events may include, without limitation, unauthorized attempts to gain entry to a vehicle, unauthorized attempts to start a vehicle engine, vehicle impacts, the presence and/or movement of a physical object proximate to or within a vehicle, a physical object touching a vehicle, receipt of a wireless alarm signal (e.g., a wireless alarm signal received from a keyless entry remote control device associated with a vehicle), and any other event that may be detected by a vehicle and/or a vehicle alarm.

In certain embodiments, a vehicle alarm may support multiple different types of vehicle alarm trigger events. For example, certain events may be classified as "unauthorized vehicle access" events (e.g., a detected attempt to open a vehicle door without authorization), certain events may be classified as "vehicle impact" events (e.g., a detected impact of an object with a vehicle), and certain other events may be classified as "vehicle locating" events (e.g., a receipt of a wireless signal from a keyless remote entry device) in some implementations. These examples of types of vehicle alarm trigger events are illustrative only. Other types of events may be defined in other implementations.

Exemplary vehicle alarm customization systems and methods will now be described with reference to the accompanying drawings.

FIG. 1 illustrates an exemplary vehicle alarm customization system 100 ("system 100"). System 100 may include, but is not limited to, a user interface facility 102, an audio content access facility 104, a vehicle alarm customization facility 106, and a data storage facility 108. As described herein, facilities 102-108 of system 100 may be configured to perform one or more functions associated with customization of a vehicle alarm.

While an exemplary system 100 is shown in FIG. 1, the configuration of system 100 illustrated in FIG. 1 is not intended to be limiting. Additional or alternative configurations may be used in other embodiments.

System 100, including facilities 102-108, may include any computer hardware and/or computer-implemented instructions (e.g., software), or combinations of computer-implemented instructions and hardware, configured to perform one or more of the processes described herein. In particular, system 100 may be implemented on one physical computing device or may be implemented on more than one physical computing device. Accordingly, system 100 may include and/or be implemented on any number of computing devices, and may employ any of a number of computer operating systems. Moreover, it will be recognized that although facilities 102-108 are shown to be separate facilities in FIG. 1, any of those facilities may be combined into a single facility as may serve a particular application.

Accordingly, one or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

The components of system 100 may communicate one with another using any suitable communication technologies, devices, networks, media, and protocols supportive of data communications. For example, components of system 100 may communicate directly or indirectly, including by way of one or more data communication connections and/or data communication networks in certain implementations.

Turning now to the individual elements of system 100, user interface facility 102 may be configured to facilitate user interaction with system 100. In particular, user interface facility 102 may provide a user interface configured to facilitate user interaction with system 100. The user interface may be in any form suitable for facilitating user interaction with system 100. For instance, the user interface may include a graphical user interface, a voice recognition interface, and any other suitable user interface that facilitates an end user interacting with system 100.

The user interface may be configured to facilitate end-user customization of a vehicle alarm. For example, the user interface may be configured to facilitate an end-user selection of an audio content instance to be associated with the vehicle alarm. In some examples, the user interface may include a menu of audio content instances that may be selected by an end user. Accordingly, user interface facility 102 may receive, via the user interface, user input such as a user selection of an audio content instance to be used to customize the vehicle alarm.

In addition, in certain embodiments, the user interface may be configured to facilitate an end-user selection of a vehicle alarm trigger event to be associated with (e.g., mapped to) a selected audio content instance such that a detection of the vehicle alarm trigger event by the vehicle alarm will cause the selected audio content instance to be sounded as an alarm by the vehicle alarm. In some examples, the user interface may include a menu of vehicle trigger events that may be selected by an end user. Accordingly, user interface facility 102 may receive, via the user interface, user input such as a user selection of a vehicle alarm trigger event to be used to customize the vehicle alarm.

User interface facility 102 may be further configured to provide vehicle alarm customization status data to an end user via a user interface. Accordingly, the end user may be able to access system 100 and ascertain how a vehicle alarm is currently customized. For example, the user interface may indicate custom vehicle alarm audio settings, including the identity of custom audio content associated with the vehicle alarm. User interface facility 102 may obtain vehicle alarm customization status data from any suitable source, including from a vehicle alarm and/or from data stored in a data storage facility such as data storage facility 108.

Figure 2:
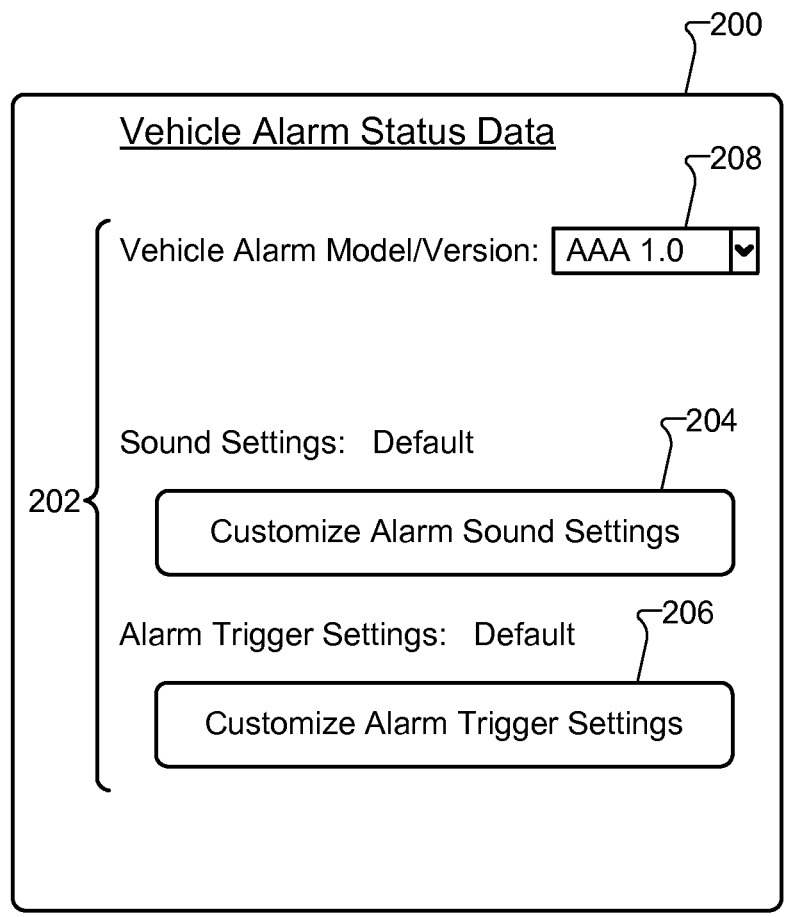
FIG. 2 illustrates an exemplary graphical user interface configured to facilitate customization of a vehicle alarm.

FIG. 2 illustrates an exemplary graphical user interface ("GUI") 200 that may be provided for display by user interface facility 102. As shown, GUI 200 may include vehicle alarm customization status data 202 (or simply "status data") displayed therein. In the illustrated example, status data 202 includes an indication of a vehicle alarm model and version (e.g., "AA 1.0"), current vehicle alarm sound settings (e.g., "default"), and current vehicle alarm trigger settings (e.g., "default"). When vehicle alarm sound settings and/or current vehicle alarm trigger settings are customized and no longer set to default settings, the information in GUI 200 may be updated to reflect the current sound and trigger settings. The status data 202 shown in FIG. 2 is illustrative only. Status data 202 may include any information descriptive of or otherwise associated with a vehicle alarm and the current settings of the vehicle alarm.

GUI 200 may be configured to facilitate customization of a vehicle alarm. User input may be provided and detected in GUI 200 in any suitable way and using any suitable user input technologies (e.g., touch screen technologies). As shown in FIG. 2, GUI 200 may include a "customize alarm sound settings" button 204, a "customize alarm trigger settings" button 206, and a vehicle alarm selection tool 208.

Vehicle alarm selection tool 208 may be used by an end user to select a particular vehicle alarm (e.g., a vehicle alarm model and/or version) to be customized. In some examples, vehicle alarm selection tool 208 may provide a menu of vehicle alarms from which an end user may select. The menu may include an expansive list of vehicle alarms that are available on the market or a tailored list of vehicle alarms associated with an end user, a vehicle, and/or a type of vehicle. In certain embodiments, system 100 may be configured to detect a vehicle alarm installed in a vehicle and pre-select the detected vehicle alarm in vehicle alarm selection tool 208.

In certain alternative embodiments, in addition or alternative to vehicle alarm selection tool 208, GUI 200 may include a vehicle selection tool, which may display a menu of vehicles from which an end user may select. In response to a selection of a vehicle, system 100 may automatically select one or more vehicle alarm models typically installed in the selected type of vehicle. This may help an end user identify and select a vehicle alarm model to be customized based on information about a vehicle associated with the end user. In other embodiments, system 100 may be configured to automatically detect a vehicle type (e.g., a make and/or model of a vehicle) without user input. For example, when a vehicle communicates with a component of system 100, system 100 may be able to determine the type of the vehicle.

Button 204 and/or button 206 may be selected by an end user viewing GUI 200. In response to a user selection of button 204 or button 206, user interface facility 102 may provide another GUI for display. The other GUI may include one or more tools configured to facilitate customization of one or more vehicle alarm sound settings and/or one or more vehicle alarm trigger settings.

Figure 3:
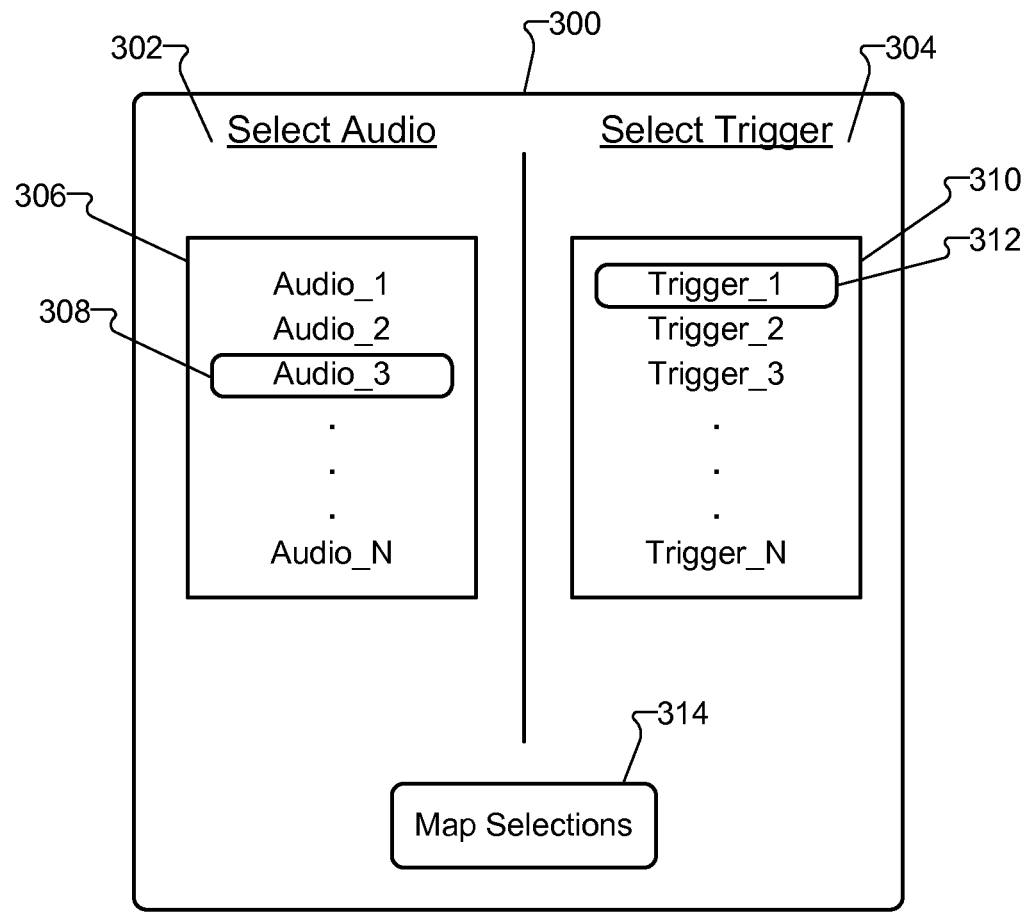
FIG. 3 illustrates another exemplary graphical user interface configured to facilitate customization of a vehicle alarm.

FIG. 3 illustrates another exemplary GUI 300 configured to facilitate customization of a vehicle alarm. In certain embodiments, user interface facility 102 may be configured to provide GUI 300 for display in response to a user selection of button 204 or button 206 in GUI 200.

As shown in FIG. 3, GUI 300 may include an audio selection section 302 and a trigger selection section 304. Audio selection section 302 may include one or more tools configured to facilitate a user selection of audio content to be used to customize a vehicle alarm. As an example, audio selection section 302 may include a list 306 of selectable audio content instances and a selector 308 that may be used by an end user to indicate a selection of an audio content instance from list 306. Accordingly, an end user may provide input indicating a user selection of an audio content instance to be used to customize a vehicle alarm.

Trigger selection section 304 may include one or more tools configured to facilitate a user selection of one or more vehicle alarm trigger events to be associated with a selected audio content instance. As an example, trigger selection section 304 may include a list 310 of selectable vehicle alarm trigger events and a selector 312 that may be used by an end user to indicate a selection of a trigger event from list 310. Accordingly, an end user may provide input indicating a user selection of a vehicle alarm trigger event to be associated with a selected audio content instance.

With an audio content instance and a trigger event selected in GUI 300, an end user may select a "map selections" button 314 to instruct system 100 to map the selected audio content instance with the selected trigger event in a vehicle alarm such that the vehicle alarm is configured to sound the selected audio content instance as an alarm in response to the selected trigger event. The mapping of the audio content instance to the trigger event may be accomplished in any suitable way, including in any of the ways described further below.

While FIG. 3 illustrates exemplary tools configured to facilitate end-user customization of a vehicle alarm, the exemplary tools are illustrative only and not limiting in any sense. GUI 300 may provide other customization tools in other embodiments. In certain examples, user interface facility 102 may be configured to tailor the contents of GUI 200 and/or GUI 300 based on detected capabilities and/or customization options of a vehicle alarm. For instance, a particular vehicle alarm may not support options for customizing predefined trigger events such as by mapping certain trigger events to various audio content instances. For such a vehicle alarm, GUI 300 may include audio selection section 302 but no trigger selection section 304. Accordingly, an end user may provide input selecting an audio content instance from list 306, and system 100 may automatically associate the selected audio content instance to the predefined trigger event(s) associated with the vehicle alarm.

The exemplary GUI 200 shown in FIG. 2 and GUI 300 shown in FIG. 3 are illustrative only. User interface facility 102 may be configured to provide other GUIs and/or other types of user interfaces configured to facilitate end-user customization of a vehicle alarm.

Returning to FIG. 1, audio content access facility 104 may be configured to access data representative of audio content to be used to customize a vehicle alarm. For example, audio content access facility 104 may access an audio content instance selected by an end user via a user interface as described above.

Data representative of audio content may be accessed and obtained from any suitable source. For example, audio content access facility 104 may access audio content 110 stored in data storage facility 108. Data storage facility 108 may include one or more data storage media, devices, and/or configurations and may employ any type, form, and combination of data storage media and/or device. For example, data storage facility 108 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in data storage facility 108. Data storage facility 108 may include a local and/or a remote data storage device storing audio content and/or other data that may be locally and/or remotely accessed and used to customize a vehicle alarm. Several examples of accessing audio content to be used to customize a vehicle alarm are described further below.

Vehicle alarm customization facility 106 may be configured to interface with a vehicle alarm. Vehicle alarm customization facility 106 may be configured to utilize any suitable communication technologies to interface with the vehicle alarm. Examples of such communication technologies may include remote and/or local data communication technologies, application program interfaces, embedded systems interfaces, and any other vehicle alarm interface technologies.

In certain embodiments, vehicle alarm customization facility 106 may be configured to detect one or more vehicle alarm customization options associated with a vehicle alarm. Such vehicle alarm customization options may indicate one or more capabilities of a vehicle alarm for being customized, including whether the vehicle alarm is customizable. In some examples, a vehicle alarm may not be customizable, and vehicle alarm customization facility 106 may detect the incapability of the vehicle alarm to be customized. In other examples, a vehicle alarm may be customizable, and vehicle alarm customization facility 106 may detect the capability of the vehicle alarm to be customized.

In addition to determining whether a vehicle alarm is customizable, vehicle alarm customization facility 106 may be configured to detect one or more options available for customizing a vehicle alarm. As an example, certain vehicle alarms may be able to support custom association of multiple different audio content instances with various vehicle alarm triggers and/or types of vehicle alarm triggers. For instance, a vehicle alarm may include data storage capacity capable of storing data representative of multiple different audio content instances as well as data representative of associations between the audio content instances and specific vehicle alarm trigger events or types of vehicle alarm trigger events. As mentioned above, user interface facility 102 may be configured to tailor a user interface to the detected customization options of a vehicle alarm.

Vehicle alarm customization facility 106 may be configured to detect one or more vehicle alarm customization options in any suitable way. In some examples, this may be accomplished by vehicle alarm customization facility 106 communicating with a vehicle alarm to access data representative of the vehicle alarm customization options. In other examples, vehicle alarm customization facility 106 may access vehicle alarm data 112 stored in a data storage facility such as data storage facility 108 to detect vehicle alarm customization options. In certain embodiments, vehicle alarm customization facility 106 may be configured to determine vehicle alarm customization options based on information about a vehicle alarm such as a type, model, and/or version of the vehicle alarm and/or information about a type and/or model of a vehicle in which the vehicle alarm is installed. The vehicle alarm data 112 may include any information descriptive of or otherwise associated with one or more vehicle alarms and/or vehicles in which vehicle alarms are installed.

Vehicle alarm customization facility 106 may be configured to customize a vehicle alarm. For example, vehicle alarm customization facility 106 may be configured to customize a vehicle alarm to sound at least part of a particular end-user-selected audio content instance in response to a vehicle alarm trigger event. The audio content instance may be selected by an end user via a user interface provided by user interface facility 102, as described above.

The customization of the vehicle alarm may be accomplished by vehicle alarm customization facility 106 in any suitable way. In certain embodiments, for example, vehicle alarm customization facility 106 may be configured to cause data representative of at least part of an audio content instance to be stored to a memory device of the vehicle alarm and to cause the stored audio content instance to be associated with a particular alarm trigger event in the vehicle alarm. This may include vehicle alarm customization facility 106 writing data to the memory device of the vehicle alarm or directing the vehicle alarm to write data to the memory device of the vehicle alarm. The writing may include adding to or overwriting data already stored within the memory device of the vehicle alarm. In some examples, vehicle alarm customization facility 106 may cause a default alarm audio content instance stored in the memory device of the vehicle alarm to be replaced with at least part of an audio content instance selected by an end user. In other embodiments, vehicle alarm customization facility 106 may store data representative of an end-user-selected audio content instance to a memory device of a vehicle alarm without overwriting or otherwise deleting a default audio content instance already stored in the memory device where sufficient memory capacity exists in the memory device.

In certain embodiments, vehicle alarm customization facility 106 may be configured to process audio content to conform to one or more requirements of a vehicle alarm. For example, vehicle alarm customization facility 106 may detect an audio content requirement of a vehicle alarm and modify at least part of an audio content instance to conform to the audio content requirement of the vehicle alarm. The audio content requirement of the vehicle alarm may be detected in any suitable way, such as by vehicle alarm customization facility 106 interacting with the vehicle alarm and/or accessing vehicle alarm data 112 in data storage facility 108. Examples of audio content requirements may include, without limitation, one or more particular audio data format requirements and/or audio content size limitations. Accordingly, modifications of audio content performed by vehicle alarm customization facility 106 may include, but are not limited to, converting at least part of an audio content instance from one data format to another data format and resizing (e.g., truncating) at least part of an audio content instance to fit within a memory space requirement of the vehicle alarm.

In certain embodiments, customization of a vehicle alarm by vehicle alarm customization facility 106 may include vehicle alarm customization facility 106 transmitting data representative of at least part of an audio content instance from system 100 to the vehicle alarm for storage in a memory device of the vehicle alarm. The transmission may be accomplished in any suitable way and may include a local and/or remote transmission of data. In certain embodiments, for example, the transmission may be transported over a local connection (e.g., a local wireless connection such as a Bluetooth or Wi-Fi connection). In other examples, the transmission may be conducted over a remote wireless network connection (e.g., a satellite or mobile phone data network connection).

Figure 4:
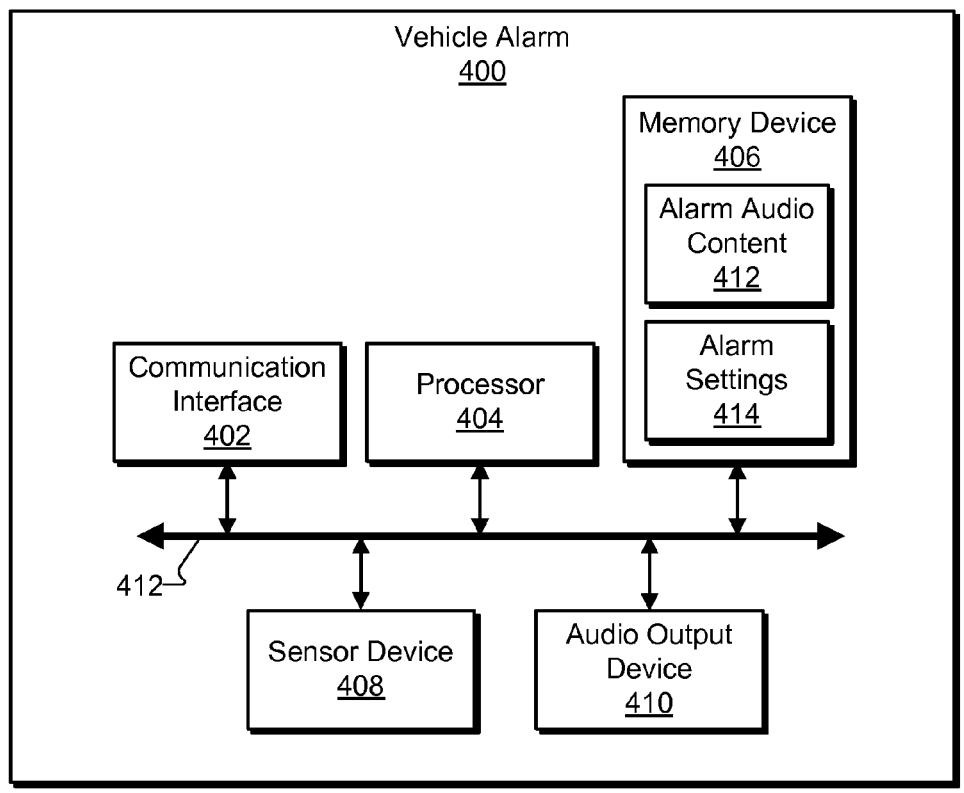
FIG. 4 illustrates an exemplary customized vehicle alarm.

FIG. 4 illustrates an exemplary vehicle alarm 400 customized by vehicle alarm customization facility 106 to sound a particular audio content instance in response to a particular vehicle alarm trigger event. Vehicle alarm 400 may include or be implemented using hardware, computer-executable instructions, or a combination thereof. Vehicle alarm 400 may be implemented on one or more devices. Typically, vehicle alarm includes and/or is implemented by one or more vehicle devices installed in a vehicle such as an automobile.

As shown in FIG. 4, vehicle alarm 400 may include a communication interface 402, a processor 404, a memory device 406, a sensor device 408, and an audio output device 410 communicatively coupled one to another via a communication infrastructure 412. The components of vehicle alarm 400 may communicate with one another, including sending data to and receiving data from one another, using any suitable communication technologies.

While an exemplary vehicle alarm 400 is shown in FIG. 4, the components illustrated in FIG. 4 are not intended to be limiting. Additional or alternative components may be used in other embodiments. Components of the vehicle alarm 400 shown in FIG. 4 will now be described in additional detail.

Communication interface 402 may be configured to communicate with one or more computing devices, including one or more vehicle devices, remote devices, and/or end-user devices. Vehicle alarm customization facility 106 of system 100 may be configured to communicate with vehicle alarm 400 via communication interface 402. Examples of communication interface 402 may include, without limitation, a wired network interface (such as a network interface card), a wireless network interface (such as a wireless network interface card), a modem, and any other suitable interface. In at least one embodiment, communication interface 402 may provide a direct connection between vehicle alarm 400 and system 100 via a direct link to a network, such as the Internet. Communication interface 402 may additionally or alternatively provide such a connection through, for example, a local area network (such as an Ethernet or vehicle network), a personal area network, a telephone or cable network, a mobile phone data network, a satellite data network, or any other suitable connection.

In some examples, communication interface 402 may be configured to receive data representative of one or more audio content instances from system 100 along with data representative of instructions to utilize the audio content instance(s) to customize vehicle alarm 400. Such data may be received in one or more audio content data streams, as one or more data files, or in any other suitable manner as may serve a particular application.

Processor 404 generally represents any type or form of processing unit capable of processing data or interpreting, executing, and/or directing execution of one or more of the vehicle alarm instructions, processes, and/or operations described herein. Processor 404 may direct execution of vehicle alarm operations in accordance with computer-executable instructions such as may be stored in memory device 406 or another computer-readable medium. As an example, processor 404 may be configured to initiate a sounding of a vehicle alarm defined by alarm audio content 412 and in accordance with alarm settings 414 stored in memory device 406 or another computer-readable medium.

Memory device 406 may include one or more data storage media, devices, or configurations and may employ any type, form, and combination of data storage media and/or device. For example, memory device 406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in memory device 406. For example, data representative of alarm audio content 412 and alarm settings 414 configured to direct processor 404 to perform one or more vehicle alarm operations may be stored within memory device 406.

Alarm audio content 412 may include data representative of at least part of one or more end-user-selected audio content instances, which may be selected and provided to vehicle alarm 400 and used to customize vehicle alarm 400 as described above. For example, alarm audio content 412 may include data representative of at least part of a particular audio content instance selected by an end user for association with vehicle alarm 400.

Alarm settings 414 may include data representative of one or more associations (e.g., mappings) between one or more audio content instances included in alarm audio content 412 and one or more vehicle alarm trigger events. For example, alarm settings 414 may include data representative of a mapping between at least part of a particular audio content instance included in alarm audio content 412 and a particular vehicle alarm trigger event. The mapping may be created by system 100 and/or vehicle alarm 400 as part of the customization of vehicle alarm 400 based on user selections of the audio content instance and the vehicle alarm trigger event and stored in alarm settings 414. Accordingly, when vehicle alarm 400 detects an occurrence of the vehicle alarm trigger event, vehicle alarm 400 may sound the audio content instance associated with the vehicle alarm trigger event in alarm settings 414.

Sensor device 408 may include one or more sensors configured to detect one or more vehicle alarm trigger events, including any of the vehicle alarm trigger events mentioned above. Sensor device 408 may include any sensor(s) capable of detecting such trigger events.

Audio output device 410 may include one or more audio output devices, such as one or more speakers and/or amplifiers, configured to sound an audible alarm based on alarm audio content 412. For example, audio output device 410 may sound at least part of an audio content instance included in alarm audio content 412 in response to a detected vehicle alarm trigger event.

Figure 5:
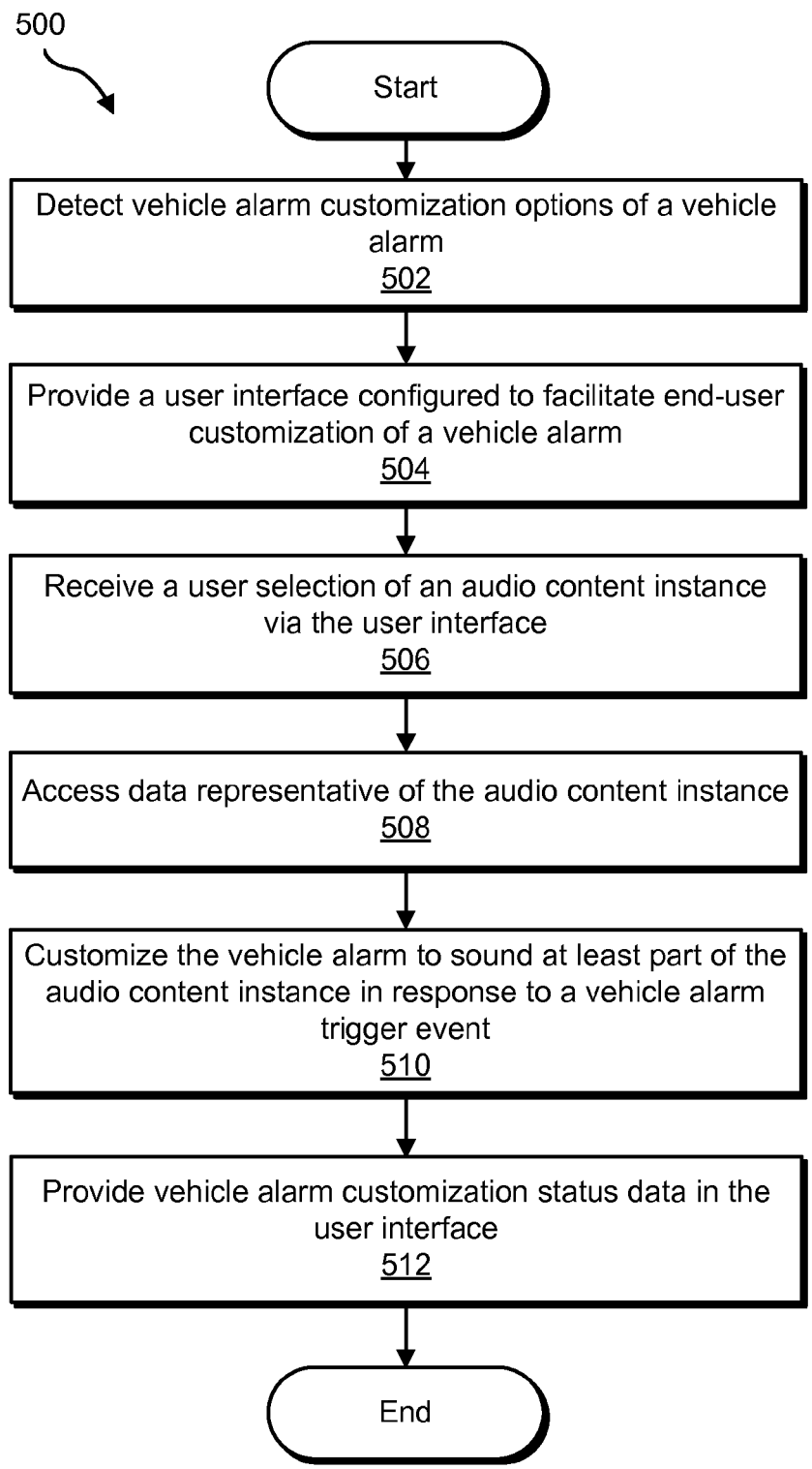
FIG. 5 illustrates an exemplary vehicle alarm customization method.

FIG. 5 illustrates an exemplary vehicle alarm customization method 500. While FIG. 5 illustrates exemplary steps according to one embodiment, other embodiments may omit, add to, reorder, and/or modify any of the steps shown in FIG. 5. One or more of the steps shown in FIG. 5 may be performed by system 100 (e.g., by one or more facilities 102-108 of system 100).

In step 502, one or more vehicle alarm customization options of a vehicle alarm are detected. For example, system 100 may detect one or more vehicle alarm customization options associated with a vehicle alarm in any of the ways described above, including determining that the vehicle alarm is customizable.

In step 504, a user interface configured to facilitate end-user customization of a vehicle alarm is provided. For example, system 100 may provide a user interface to an end user, the user interface configured, in any of the ways described above, to facilitate the end user providing input to be used to customize a vehicle alarm. In certain embodiments, the user interface may be tailored to capabilities of the vehicle alarm based on the vehicle alarm customization options detected in step 502.

In step 506, a user selection of an audio content instance is received via the user interface. For example, the end user may provide input indicating a selection of an audio content instance via the user interface, and system 100 may receive data representative of the user selection in any of the ways described above.

In step 508, data representative of the audio content instance is accessed. For example, system 100 may access data representative of the audio content instance selected by the user in step 506. System 100 may access data representative of the audio content instance in any suitable way, including in any of the ways described herein.

In step 510, the vehicle alarm is customized to sound at least part of the audio content instance in response to a vehicle alarm trigger event. For example, system 100 may customize the vehicle alarm to sound at least part of the audio content instance in response to a vehicle alarm trigger event in any of the ways described herein, including transmitting data representative of the audio content instance to the vehicle alarm and mapping (or directing the vehicle alarm to map) the data representative of the audio content instance to the vehicle alarm trigger event in the vehicle alarm.

In step 512, vehicle alarm customization status data is provided in the user interface. For example, system 100 may provide status data such as status data 202 to an end user via the user interface in any of the ways described above.

In this or similar manner, a vehicle alarm such as vehicle alarm 400 may be customized to sound at least part of an end-user-selected audio content instance in response to a vehicle alarm trigger event. Because the audio content instance has been selected by an end user and the vehicle alarm customized accordingly, the end user may readily recognize, when the vehicle alarm sounds the end-user-selected audio content instance (instead of generic, default alarm audio), that the alarm is associated with the end user's vehicle.

As mentioned, additional steps may be added to other embodiments of method 500. As an example, in addition to receiving a user selection of an audio content instance, a user selection of a vehicle alarm trigger event to be associated with the selected audio content instance may be received and used to customize the vehicle alarm such as by mapping the selected audio content instance to the selected vehicle alarm trigger event in the vehicle alarm based on the user selections of the audio content instance and the vehicle trigger event.

One or more of the steps of method 500 may be repeated to further customize a vehicle alarm. For example, steps 506-510 may be repeated to receive a user selection of another audio content instance via the user interface, access data representative of the other audio content instance, and customize the vehicle alarm to sound at least part of the other audio content instance in response to another, different, vehicle alarm trigger event. Accordingly, when supported by a vehicle alarm, multiple, different, end-user-selected audio content instances may be used to customize the vehicle alarm.

When customized in this manner, the vehicle alarm may be configured to sound any one of a plurality of end-user-selected audio content instances in response to a particular vehicle alarm trigger event or type of vehicle alarm trigger event. For example, a first audio content instance may be sounded in response to a first vehicle alarm trigger event or type of vehicle alarm trigger event (e.g., an unauthorized vehicle access event), and a second audio content instance may be sounded in response to a second vehicle alarm trigger event or type of vehicle alarm trigger event (e.g., a vehicle locating event).

Figure 6:
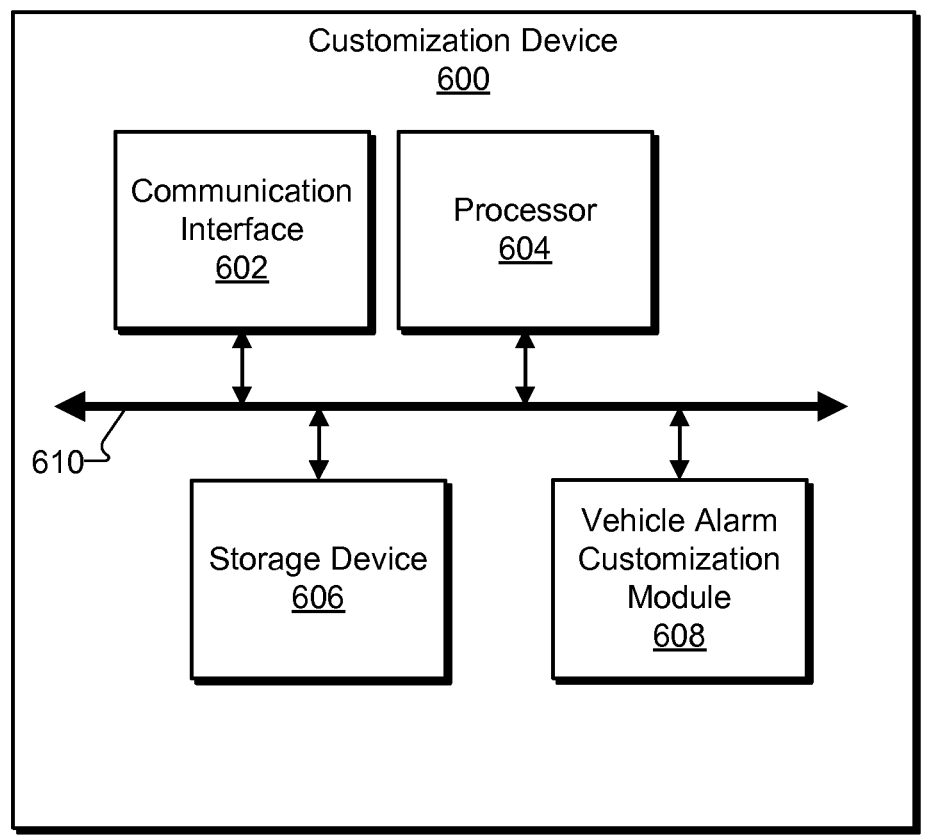
FIG. 6 illustrates an exemplary device implementation of the system of FIG. 1.

FIG. 6 illustrates an exemplary device implementation of the system 100 of FIG. 1. As shown in FIG. 6, a customization device 600 may include a communication interface 602, a processor 604, a storage device 606, and a vehicle alarm customization module 608 (or simply "module 608") communicatively coupled one to another via a communication infrastructure 610. The components of customization device 600 may communicate with one another, including sending data to and receiving data from one another, using any suitable communication technologies.

Turning to the individual components of customization device 600 shown in FIG. 6, communication interface 602 may be configured to communicate with one or more computing devices, including one or more vehicle devices, vehicle alarm devices, end-user devices, and/or network devices. Examples of communication interface 602 may include, without limitation, a wired network interface (such as a network interface card), a wireless network interface (such as a wireless network interface card), a local wired or wireless connection interface (e.g., an auxiliary jack interface and/or a Bluetooth or Wi-Fi interface), a modem, and any other suitable interface. In at least one embodiment, communication interface 602 may provide a direct connection between customization device 600 and a vehicle device and/or a vehicle alarm device. Communication interface 602 may additionally or alternatively provide such a connection through, for example, a local area network (such as an Ethernet or vehicle network), a personal area network, a telephone or cable network, a mobile phone data network, a satellite data network, or any other suitable connection. Additionally or alternatively, communication interface 602 may provide a connection between customization device 600 and a network device and/or a remote data storage device.

In some examples, communication interface 602 may be configured to transmit data representative of one or more audio content instances to a vehicle alarm (or a vehicle in which a vehicle alarm is installed) along with data representative of instructions to utilize the audio content instance(s) to customize the vehicle alarm. Such data may be transmitted and received in one or more audio content data streams, as one or more data files, or in any other suitable manner as may serve a particular application.

Processor 604 generally represents any type or form of processing unit capable of processing data or interpreting, executing, and/or directing execution of one or more of the vehicle alarm customization instructions, processes, and/or operations described herein. Processor 604 may direct execution of vehicle alarm customization operations in accordance with computer-executable instructions such as may be stored in storage device 606 or another computer-readable medium.

Storage device 606 may include one or more data storage media, devices, or configurations and may employ any type, form, and combination of data storage media and/or device. For example, storage device 606 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 406.

Module 608 may be configured to perform and/or direct one or more components of customization device 600 to perform one or more of the vehicle alarm customization operations described herein. Module 608 may be implemented as hardware, computer-readable instructions, or a combination thereof in customization device 600. In certain embodiments, module 608 may include one or more applications configured to run on customization device 600.

In some examples, one or more of the facilities 102-108 shown in FIG. 1 may be implemented by or within one or more components of customization device 600. For example, one or more applications residing within storage device 606 may be configured to direct processor 604 to perform one or more processes or functions associated with one or more of the facilities 102-106. Likewise, data storage facility 108 may be implemented by or within storage device 606. For example, audio content 110 and/or vehicle alarm data 112 may be stored within storage device 606.

Customization device 600 may include any device suitable for customizing a vehicle alarm as described herein. In certain embodiments, customization device 600 may include a vehicle device (e.g., a vehicle computing device) installed within a vehicle. In certain embodiments, customization device 600 may include a vehicle alarm device (e.g., vehicle alarm 400) installed within a vehicle. In certain embodiments, customization device 600 may include an end-user device configured to communicate with a vehicle alarm device and/or a vehicle device. In certain embodiments, customization device 600 may include a network device (e.g., a device on a wireless network such as a satellite data network or a mobile phone data network) configured to communicate with a vehicle alarm device, a vehicle device, and/or an end-user device that is configured to communicate with the vehicle alarm device and/or the vehicle device.

While FIG. 6 illustrates an exemplary single-device implementation of system 100, in certain embodiments, components of system 100 and/or customization device 600 may be distributed across multiple devices configured to communicate with one another. For example, components of system 100 and/or customization device 600 may be distributed across a vehicle device, a vehicle alarm device, an end-user device, a network device, and/or any combination or sub-combination thereof.

Certain exemplary vehicle alarm customization systems will now be described. The exemplary systems are illustrative only and not limiting in any sense. Other configurations of system 100 may be implemented in other embodiments.

In certain embodiments, system 100 may be implemented entirely within a vehicle, such as on one or more manufacturer-installed and/or after-market vehicle devices and/or vehicle alarm devices installed in a vehicle. In such embodiments, one or more vehicle devices within a vehicle may provide a vehicle user interface (e.g., a user interface provided by a vehicle information system and/or entertainment system display) configured to facilitate end-user-customization of a vehicle alarm installed within the vehicle and receive user input, such as user input indicating a user selection of an audio content instance, via the vehicle user interface. Data representative of the selected audio content instance may be accessed and obtained from a vehicle data storage device (e.g., a hard drive integrated within the vehicle) storing audio content. The vehicle alarm installed in the vehicle may then be customized to sound at least part of the audio content instance in response to a vehicle alarm trigger event in any of the ways described above.

In other embodiments, one or more components and/or operations of system 100 may be implemented and/or performed, at least in part, external to a vehicle in which a vehicle alarm is installed. FIGS. 7-10 illustrate exemplary vehicle alarm customization systems in which one or more components and/or operations of system 100 are implemented and/or performed external to a vehicle.

Figure 7:
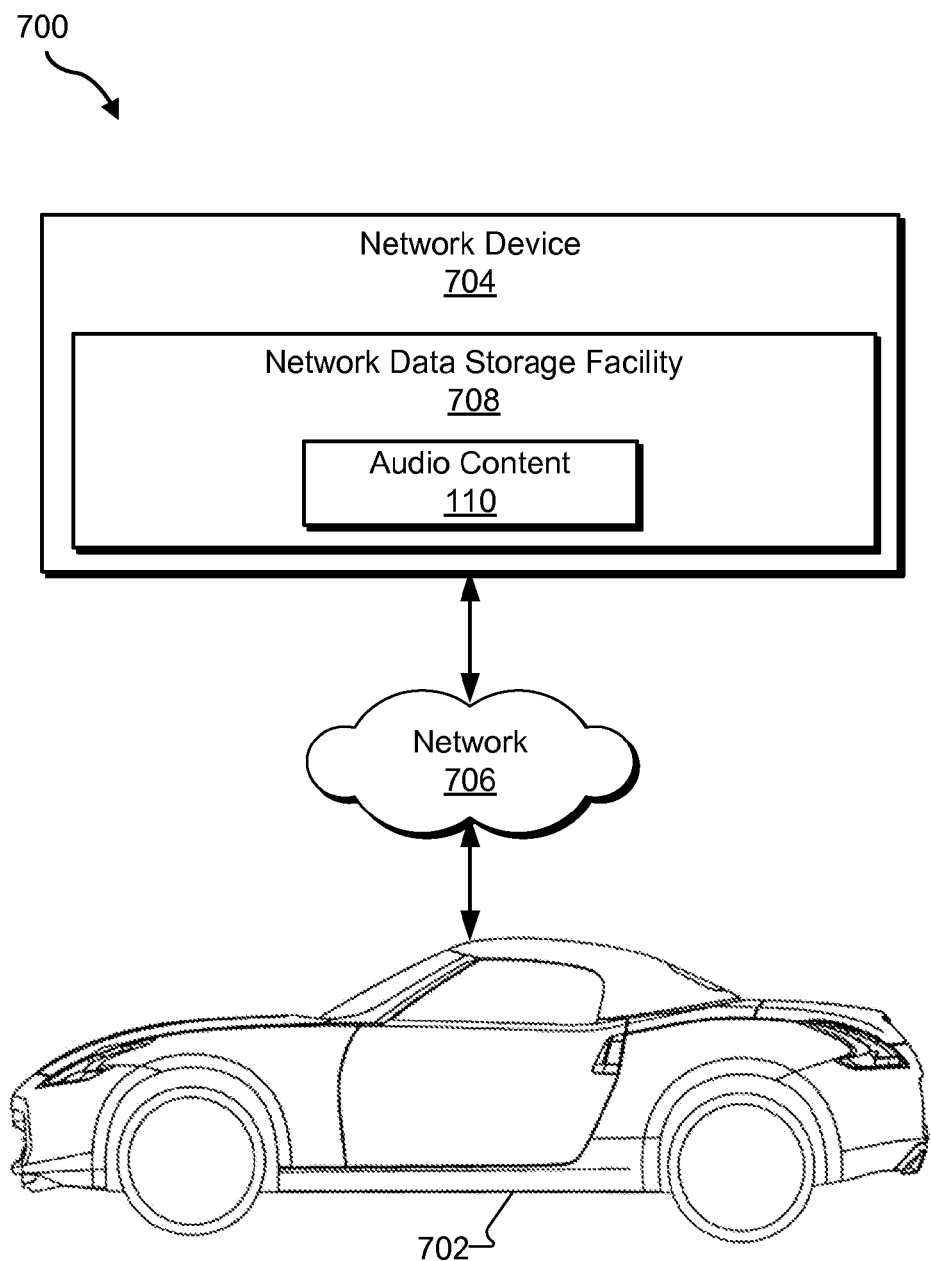
FIGS. 7-10 illustrate exemplary vehicle alarm customization systems.

FIG. 7 illustrates an exemplary vehicle alarm customization system ("system 700") in which a vehicle 702 and a network device 704 are configured to communicate with one another via a network 706. In system 700, one or more components and/or operations of system 100 may be implemented in and/or performed by network device 704. Hence, an end user of vehicle 702 may utilize vehicle 702 to access one or more components and/or operations of system 100 implemented on and/or performed by network device 704.

As an example, one or more vehicle devices within vehicle 702 may provide a vehicle user interface (e.g., a user interface provided by a vehicle information system and/or entertainment system display) through which an end user (e.g., a subscriber to a wireless service provided by network device 704) of vehicle 702 may access one or more components and/or operations of system 100. For instance, through the vehicle user interface, a user interface configured to facilitate end-user-customization of a vehicle alarm installed within vehicle 702 may be provided by user interface facility 102 to the end user and user input, such as user input indicating a user selection of an audio content instance, may be received.

In some examples, data representative of the selected audio content instance may be accessed and obtained by system 100 from network device 704 via network 706. As shown in FIG. 7, network device 704 may include a network data storage facility 708 storing audio content 110. Accordingly, one or more components of system 100 implemented in a vehicle device installed within vehicle 702 may request and receive data representative of audio content 110 from network data storage facility 708 of network device 704 via network 706. The vehicle alarm installed in vehicle 702 may then be customized to sound at least part of the selected audio content instance as an alarm in response to a vehicle alarm trigger event in any of the ways described above.

Network 706 may include one or more networks or types of networks (and communication links thereto) capable of carrying communications and/or data signals between vehicle 702 and network device 704. For example, network 706 may include, without limitation, one or more wireless networks, satellite data networks, terrestrial data networks, mobile phone networks (e.g., cellular telephone networks), broadband networks, narrowband networks, the Internet, wide area networks, local area networks, packet-switched networks, and any other networks capable of carrying communications and/or data signals between vehicle 702 and network device 704. Communications between vehicle 702 and network device 704 may be transported using any one of the above-listed networks, or any combination or sub-combination of the above-listed networks. In certain embodiments, network 706 includes a wireless satellite data network through which vehicle 702 and/or an end user of vehicle 702 may access one or more wireless services, such as a vehicle alarm customization service. Network device 704 may include any computing device(s) accessible to vehicle 702 via network 706.

Figure 8:
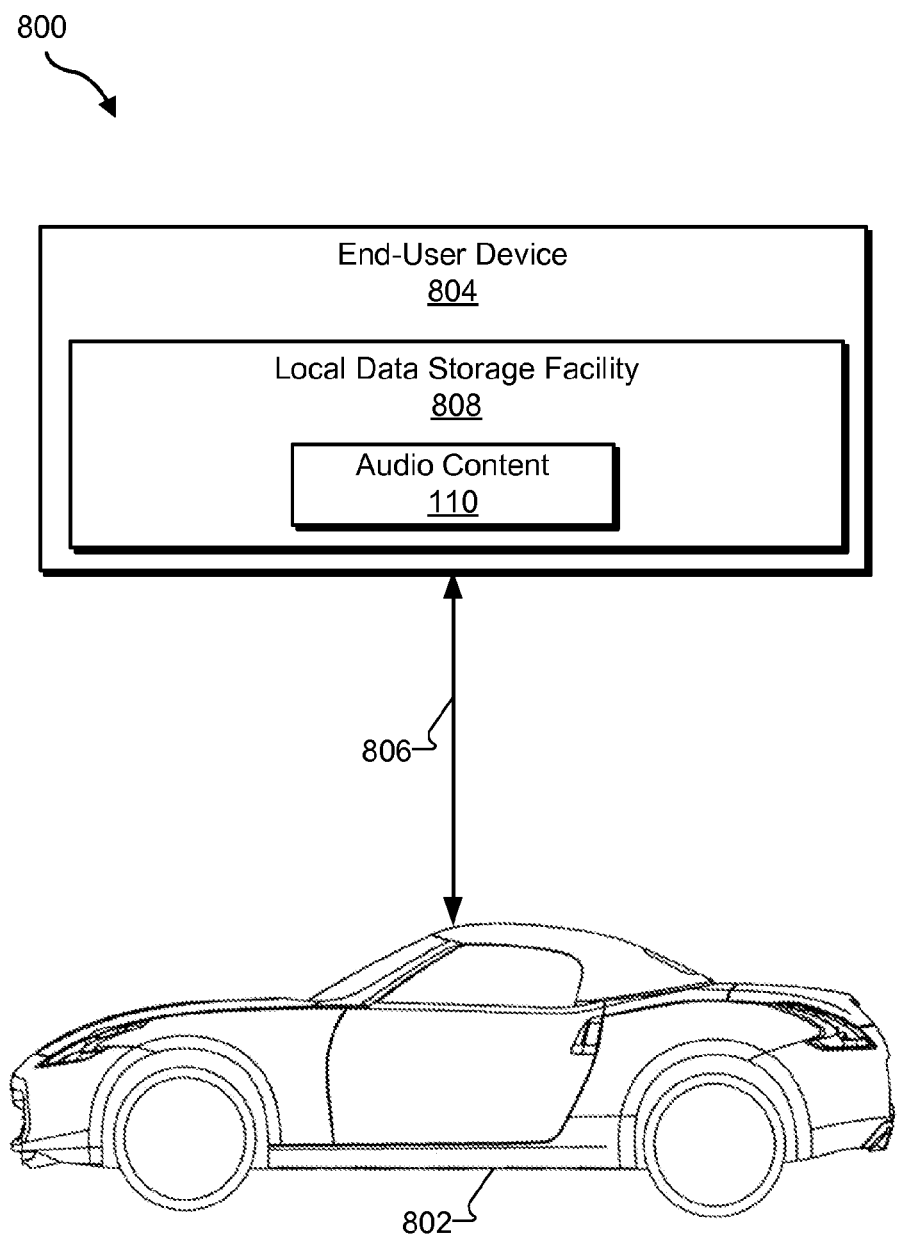

FIG. 8 illustrates an exemplary vehicle alarm customization system ("system 800") in which a vehicle 802 and an end-user audio content access device 804 (or simply "end-user device 804") are configured to communicate with one another via a local connection 806. In system 800, one or more components and/or operations of system 100 may be implemented in and/or performed by end-user device 804. Hence, a user of end-user device 804 may utilize the end-user device 804 to access one or more components and/or operations of system 100 implemented on and/or performed by end-user device 804.

As an example, end-user device 804 may provide a user interface through which a user of end-user device 804 may access one or more components and/or operations of system 100. For instance, through end-user device 804, a user interface configured to facilitate end-user-customization of a vehicle alarm installed within vehicle 802 may provided by user interface facility 102 to the user and user input, such as user input indicating a user selection of an audio content instance, may be received.

As an alternative example, one or more vehicle devices within vehicle 802 may provide a vehicle user interface (e.g., a user interface provided by a vehicle information system and/or entertainment system display) through which an end user of the vehicle 802 may access one or more components and/or operations of system 100. For instance, through the vehicle user interface, a user interface configured to facilitate end-user-customization of a vehicle alarm installed within vehicle 702 may be provided by user interface facility 102 to the end user and user input, such as user input indicating a user selection of an audio content instance, may be received.

Regardless of whether vehicle 802 or end-user device 804 is used to access a user interface configured to facilitate a user selection of an audio content instance as described above, data representative of the selected audio content instance may be accessed and obtained by system 100 from end-user device 804. As shown in FIG. 8, end-user device 804 may include a local data storage facility 808 storing audio content 110. Accordingly, one or more components of system 100 implemented in a vehicle device installed within vehicle 802 or in end-user device 804 may request and receive data representative of audio content 110 from local data storage facility 808 of end-user device 804. The vehicle alarm installed in vehicle 802 may be customized to sound at least part of the selected audio content instance in response to a vehicle alarm trigger event in any of the ways described above. For example, end-user device 804 may transmit data representative of at least part of the selected audio content instance to vehicle 802 via local connection 806 for storage in a memory device of the vehicle alarm installed in vehicle 802.

System 100 may be implemented, at least partially, within end-user device 804. In certain examples, system 100 may be implemented entirely within end-user device 804 and configured to interface with vehicle 802 and/or the vehicle alarm installed in vehicle 802 to customize the vehicle alarm. In such examples, end-user device 804 may be configured to instruct the vehicle alarm to store audio content to a memory device of the vehicle alarm and/or to modify settings of the vehicle alarm. In other examples, components and/or operations of system 100 may be distributed across end-user device 804 and vehicle 802.

Local connection 806 may include any suitable connection supportive of local data communications between vehicle 802 and end-user device 804. For example, local connection 806 may include, without limitation, a local wireless connection such as a Bluetooth connection, a Wi-Fi connection, an infrared connection, and a wireless personal area network connection. As another example, local connection 806 may include, without limitation, a wired or plug-in connection such as a USB connection and an auxiliary line connection.

End-user device 804 may include any end-user computing device accessible by an end user and configured to access audio content and communicate with one or more vehicle devices within vehicle 802. For example, end-user device 804 may include, without limitation, a media device (e.g., an mp3 player device), a mobile phone, and a personal computer.

In certain examples, end-user device 804 may be configured to record audio content, such as audio content produced by a user of end-user device 804 (e.g., a voice recording) and/or ambient audio content. The recorded audio content may be stored as audio content 110 in local data storage facility 808 of end-user device 804 such that the recorded audio content may be accessed and used to customize a vehicle alarm installed in vehicle 802.

Figure 9:
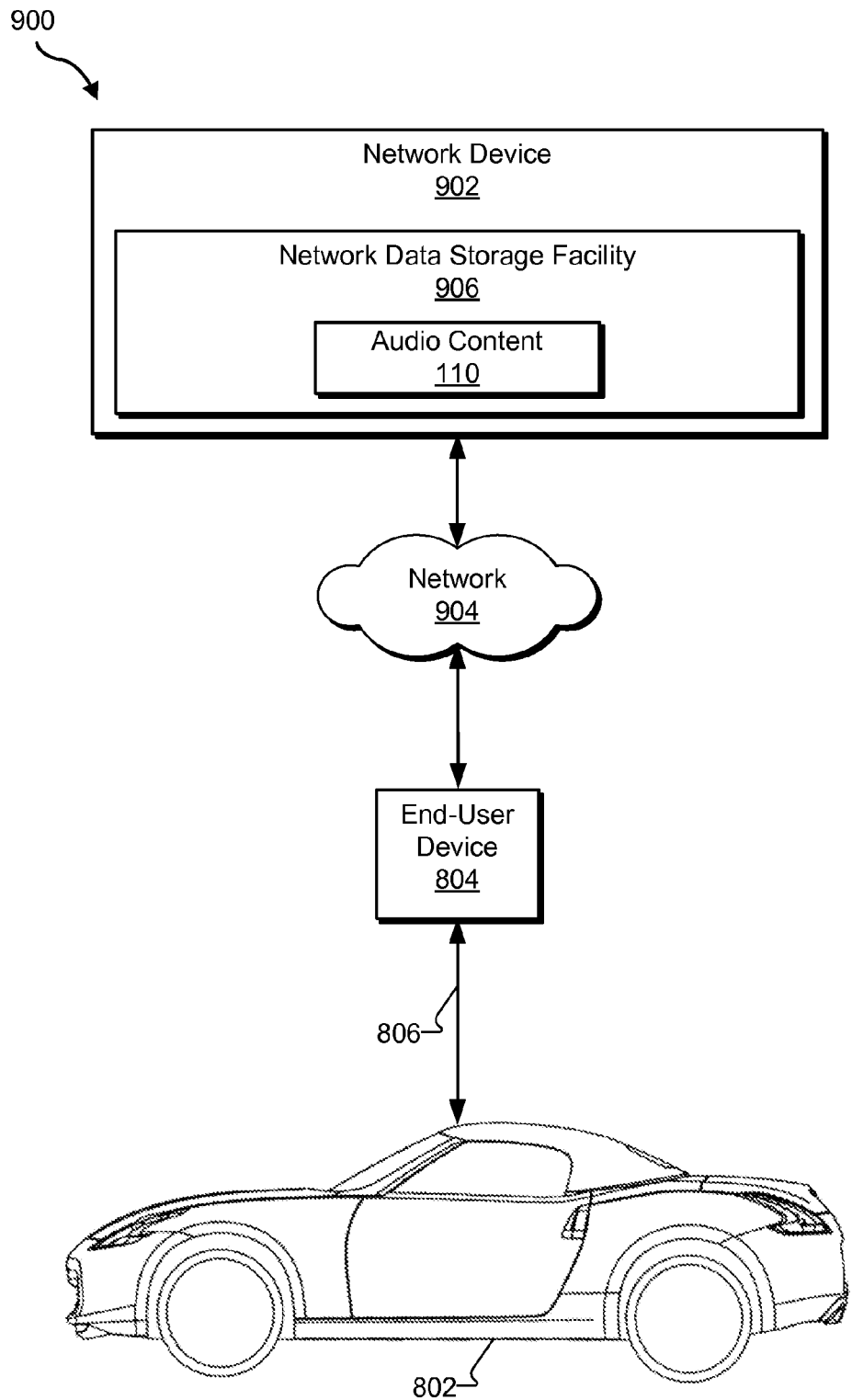

In addition or alternative to end-user device 804 accessing audio content 110 locally from local data storage facility 808, end-user device 804 may request and receive audio content 110 from a network data storage facility via a network. For example, FIG. 9 illustrates an exemplary vehicle alarm customization system ("system 900") in which vehicle 802 and end-user device 804 may be configured to operate and to communicate with one another via local connection 806 as described above. In addition, end-user device 804 and a network device 902 may be configured to communicate with one another via a network 904. In system 900, one or more components and/or operations of system 100 may be implemented in and/or performed by end-user device 804 and/or network device 902. Hence, a user of end-user device 804 may utilize end-user device 804 to access one or more components and/or operations of system 100 implemented on and/or performed by end-user device 804 and/or network device 902.

As an example, end-user device 804 may provide a user interface through which a user of end-user device 804 may access one or more components and/or operations of system 100. For instance, through a user interface provided by end-user device 804, a user may access audio content 110 stored within a network data storage facility 906 of network device 902 and select a particular audio content instance to be used to customize a vehicle alarm installed in vehicle 802. End-user device 804 may request and receive the selected audio content instance from network device 902 and use the audio content instance to customize the vehicle alarm installed in vehicle 802 as described above.

Network 904 may include one or more networks or types of networks (and communication links thereto) capable of carrying communications and/or data signals between end-user device 804 and network device 902. For example, network 904 may include, without limitation, one or more wireless networks, satellite data networks, terrestrial data networks, mobile phone networks (e.g., cellular telephone networks), broadband networks, narrowband networks, the Internet, wide area networks, local area networks, packet-switched networks, and any other networks capable of carrying communications and/or data signals between end-user device 804 and network device 902. Communications between end-user device 804 and network device 902 may be transported using any one of the above-listed networks, or any combination or sub-combination of the above-listed networks. In certain embodiments, network 904 includes a mobile phone data network through which end-user device 804 may access one or more wireless services, such as a vehicle alarm customization service and/or audio content access service. Network device 902 may include any computing device(s) accessible to end-user device 804 via network 904.

Figure 10:
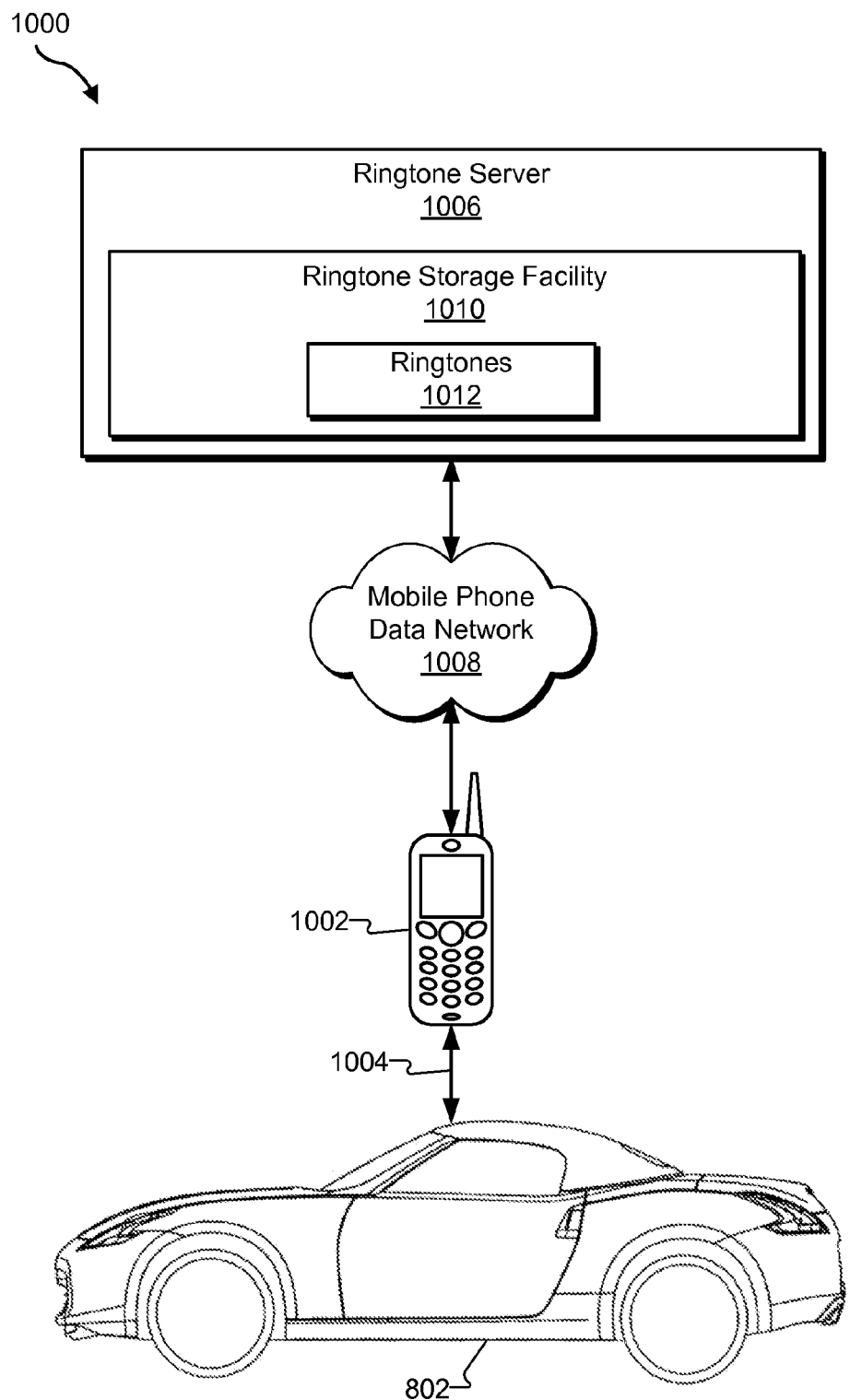

FIG. 10 illustrates an exemplary vehicle alarm customization system ("system 1000"), which is an exemplary implementation of system 900. As shown in FIG. 10, system 1000 may include vehicle 802 and a mobile phone 1002 in communication with one another via a local wireless connection 1004 (e.g., a Bluetooth connection). Mobile phone 1002 is further configured to communicate with a ringtone server 1006 via a mobile phone data network 1008. As shown, ringtone server 1006 includes a ringtone storage facility 1010 storing ringtones 1012. Accordingly, in certain embodiments, an end user of mobile phone 1002 may access and utilize a user interface to select and request a ringtone from the repository of ringtones 1012 stored in ringtone storage facility 1010. Data representative of the selected ringtone may be transmitted by ringtone server 1006 and received by mobile phone 1002 (e.g., downloaded) via mobile phone data network 1008. The ringtone may then be used to customize a vehicle alarm installed in vehicle 804 to sound the at least part of the ringtone in response to a vehicle alarm trigger event, as described above. In this or similar manner, mobile phone 1002 may be configured to leverage access to a ringtone repository and/or service to select and utilize a ringtone to customize a vehicle alarm to sound the ringtone. Accordingly, the ringtone, when sounded by the vehicle alarm, may be readily recognized by an end user of vehicle 802.

In addition or alternative to customizing a vehicle alarm to sound a ringtone accessed from ringtone server 1006, mobile phone 1002 may utilize locally stored audio content to customize a vehicle alarm. The locally stored audio content may include a ringtone and/or audio content recorded by the mobile phone using an audio recording facility implemented in the mobile phone. For example, a user of mobile phone 1002 may use mobile phone 1002 to capture a voice recording and/or a recording of ambient audio and to customize a vehicle alarm to sound the recorded audio content.

In the exemplary implementations of system 100 described above, at least one of the components of system 100 (e.g., user interface facility 102, access facility 104, customization facility 106, and data storage facility 108) may be implemented on a vehicle device installed in a vehicle, an end-user audio content access device configured to communicate with a vehicle in which a vehicle alarm is installed, and a network device configured to communicate with an end-user device and/or a vehicle in which a vehicle alarm is installed. These implementations are illustrative only. System 100 may include and/or be implemented on any suitable computing device or combination of computing devices.

In certain examples, system 100 may be configured to provide a user of an end-user device (e.g., device 804 or mobile phone 1002) with an option to "sync" a vehicle alarm with an audio content instance associated with the end-user device. As an example, mobile phone 1002 may include a ringtone stored in local memory. The ringtone may be set as an active ringtone configured to be sounded by the mobile phone 1002 in response to a predetermined event such as an incoming call. System 100 may be configured to detect this setting in mobile phone 1002 and provide a user of mobile phone 1002 with an option to "sync" a vehicle alarm to the ringtone in mobile phone 1002 such that the vehicle alarm will be customized to sound the ringtone in response to a vehicle alarm trigger event. Accordingly, a user of mobile phone 1002 (or other end-user device) may conveniently customize a vehicle alarm to sound audio that is already familiar to the user.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
providing, by a vehicle alarm customization system, a user interface on a vehicle provided display, the user interface configured to facilitate end-user customization of a vehicle alarm and to allow the user to access data representative of an audio content instance via a network;
receiving, by the vehicle alarm customization system via the user interface, an end-user selection of the audio content instance;
accessing, by the vehicle alarm customization system, data representative of the audio content instance via the network; and
customizing, by the vehicle alarm customization system, the vehicle alarm to sound at least part of the audio content instance in response to a vehicle alarm trigger event, the customizing including automatically selecting one or more vehicle alarm models based on information associated with a vehicle type, the information received when a vehicle communicates with a component of the vehicle alarm customization system.

2. The method of claim 1, wherein the customizing of the vehicle alarm comprises:
causing data representative of the at least part of the audio content instance to be stored to a memory device of the vehicle alarm; and
causing the at least part of the audio content instance stored to the memory device of the vehicle alarm to be associated with the vehicle alarm trigger event in the vehicle alarm.

3. The method of claim 1, wherein the customizing of the vehicle alarm comprises causing a default alarm audio content instance to be replaced with the at least part of the audio content instance in a memory device of the vehicle alarm.

4. The method of claim 1, wherein the customizing of the vehicle alarm comprises:
detecting an audio content requirement of the vehicle alarm; and
modifying the at least part of the audio content instance to conform to the audio content requirement of the vehicle alarm.

5. The method of claim 4, wherein the modifying of the at least part of the audio content instance comprises at least one of:
converting the at least part of the audio content instance from one data format to another data format; and
resizing the at least part of the audio content instance to fit within a memory space requirement of the vehicle alarm.

6. The method of claim 1, wherein the customizing of the vehicle alarm comprises transmitting data representative of the at least part of the audio content instance from the vehicle alarm customization system to the vehicle alarm over the network for storage in a memory device of the vehicle alarm.

7. The method of claim 6, wherein the data representative of the at least part of the audio content instance is transmitted, via the network, from an end-user audio content access device on which the vehicle alarm customization system is at least partially implemented to a vehicle in which the vehicle alarm is installed.

8. The method of claim 7, wherein:
the end-user audio content access device comprises a mobile phone; and
the network comprises a local wireless connection between the vehicle and the mobile phone.

9. The method of claim 8, wherein the audio content instance comprises a ringtone accessible by the mobile phone.

10. The method of claim 7, wherein the accessing of the data representative of the audio content instance comprises one of:
requesting and receiving, by the vehicle alarm customization system, the data representative of the audio content instance from a local data storage facility of the end-user audio content access device; and
requesting and receiving, by the vehicle alarm customization system, the data representative of the audio content instance from a network data storage facility via the network.

11. The method of claim 10, wherein the network comprises a mobile phone data network.

12. The method of claim 1, wherein the accessing of the data representative of the audio content instance comprises a vehicle within which the vehicle alarm customization system is at least partially implemented requesting and receiving the data representative of the audio content instance from a network data storage facility via the network, wherein the network is a wireless network.

13. The method of claim 1, further comprising:
receiving, by the vehicle alarm customization system via the user interface, an end-user selection of the vehicle alarm trigger event;
wherein the customizing of the vehicle alarm comprises mapping the at least part of the audio content instance to the vehicle alarm trigger event in alarm settings of the vehicle alarm based on the end-user selection of the audio content instance and the end-user selection of the vehicle alarm trigger event.

14. The method of claim 1, further comprising:
receiving, by the vehicle alarm customization system via the user interface on the vehicle provided display, an end-user selection of another audio content instance;
accessing, by the vehicle alarm customization system, data representative of the another audio content instance; and
customizing, by the vehicle alarm customization system, the vehicle alarm to sound at least part of the another audio content instance in response to another vehicle alarm trigger event.

15. The method of claim 14, wherein:
the vehicle alarm trigger event comprises an unauthorized vehicle access event; and
the another vehicle alarm trigger event comprises a vehicle locating event.

16. The method of claim 1, tangibly embodied as computer-executable instructions on at least one computer-readable medium.

17. A system comprising:
a vehicle alarm installed in a vehicle and configured to detect a vehicle alarm trigger event and sound an alarm in response to the vehicle alarm trigger event;
a user interface facility that provides a user interface on a vehicle provided display, the user interface configured to facilitate end-user customization of the vehicle alarm and receives, via the user interface, user input indicating an end-user selection of an audio content instance to be accessed via a network;

an audio content access facility that accesses data representative of the audio content instance from a data storage facility via the network; and a vehicle alarm customization facility that interfaces with the vehicle alarm and customizes the vehicle alarm to sound at least part of the audio content instance as the alarm in response to the vehicle alarm trigger event, the customizing including automatically selecting one or more vehicle alarm models based on information associated with a vehicle type, the information received when a vehicle communicates with a component of the vehicle alarm customization system.

18. The system of claim 17, wherein at least one of the user interface facility, the audio content access facility, and the vehicle alarm customization facility is implemented on a vehicle device installed in the vehicle.

19. The system of claim 17, wherein the audio content access facility is implemented on an end-user audio content access device configured to communicate with the vehicle via the network, the network comprising a local connection.

20. The system of claim 17, wherein the audio content access facility is implemented on a network device configured to communicate with the vehicle via the network, the network comprising a wireless network.

21. A system comprising:

a vehicle alarm installed in a vehicle and configured to detect a vehicle alarm trigger event and sound an alarm in response to the vehicle alarm trigger event;

a user interface on a vehicle provided display, the user interface configured to facilitate end-user customization of the vehicle alarm and to allow the user to access an audio content instance via a local wireless connection;

a mobile phone configured to communicate with the vehicle via the local wireless connection and to receive, via the local wireless connection, an end-user selection of the audio content instance selected by the end user with the user interface on the vehicle provided display, access data representative of the audio content instance via the local wireless connection, and interface with the vehicle via the local wireless connection to customize the vehicle alarm to sound at least part of the audio content instance as the alarm in response to the vehicle alarm trigger event, the customizing including automatically selecting one or more vehicle alarm models based on information associated with a vehicle type, the information received when the vehicle communicates with the mobile phone via the local wireless connection.

22. The system of claim 21, further comprising a ringtone server accessible by the mobile phone via a mobile phone data network, wherein the audio content instance comprises a ringtone provided by the ringtone server.

* * * * *